United States Patent
Tran et al.

[19]

[11] Patent Number: 5,805,415
[45] Date of Patent: Sep. 8, 1998

[54] DETACHABLE FLAT PANEL COMPUTER DISPLAY AND SUPPORT

[75] Inventors: Tuan A. Tran, Albany; Jacques H. Helot, Corvallis, both of Oreg.

[73] Assignee: Hewlett-Packard Company, Palo Alto, Calif.

[21] Appl. No.: 725,527

[22] Filed: Oct. 3, 1996

[51] Int. Cl.⁶ .................................. G06F 1/16; H05K 5/02
[52] U.S. Cl. ......................... 361/681; 248/918; 248/921
[58] Field of Search .................................. 361/680–683, 361/686; 345/169, 905, 903; 364/708.1; 248/917–923; G06F 1/16

[56] References Cited

U.S. PATENT DOCUMENTS

| | | | |
|---|---|---|---|
| D. 358,374 | 5/1995 | Yamazaki et al. | D14/106 |
| 4,749,364 | 6/1988 | Arney et al. | |
| 4,964,018 | 10/1990 | Mallory et al. | |
| 4,980,676 | 12/1990 | Nomura et al. | |
| 5,100,098 | 3/1992 | Hawkins | |
| 5,128,829 | 7/1992 | Loew | 361/681 |
| 5,196,993 | 3/1993 | Herron et al. | |
| 5,247,285 | 9/1993 | Yokata et al. | |
| 5,319,582 | 6/1994 | Ma | |
| 5,375,076 | 12/1994 | Goodrich et al. | 361/681 |
| 5,507,072 | 4/1996 | Youn | 16/261 |
| 5,582,373 | 12/1996 | Baudot | 248/166 |

*Primary Examiner*—Lynn D. Feild

[57] ABSTRACT

A notebook computer has a detachable display. A stand integral to the display supports the display while apart from a main system unit of the computer. Alternatively, a separate height adjustable stand is used to support the detached display. The display has a locked and an unlocked state while attached to the system unit. The display cannot be detached from the system unit while locked. The display unit, however, is operational and rotatable between an open position and closed position while locked. Although attached, the display cannot achieve the closed position while unlocked. In one configuration of the integral stand, two support structures are independently rotatable relative to a viewing plane with multiple degrees of freedom.

7 Claims, 7 Drawing Sheets

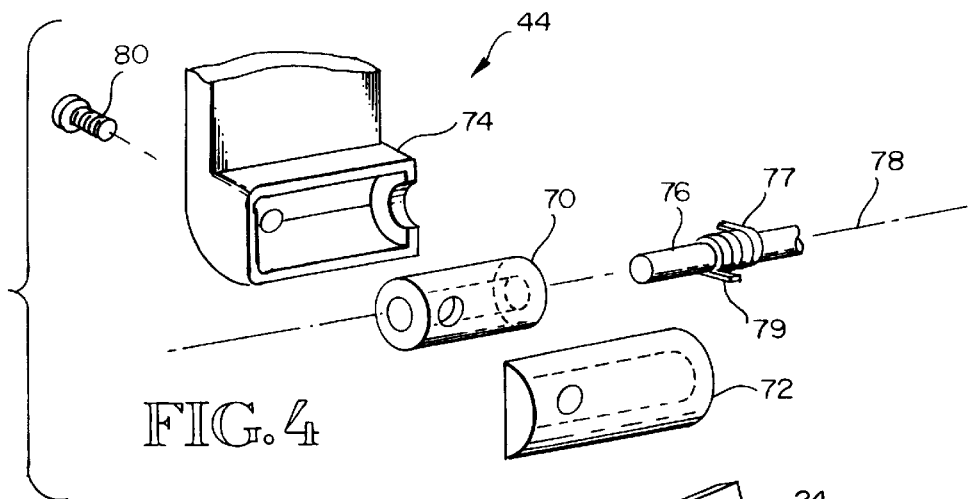
FIG. 4
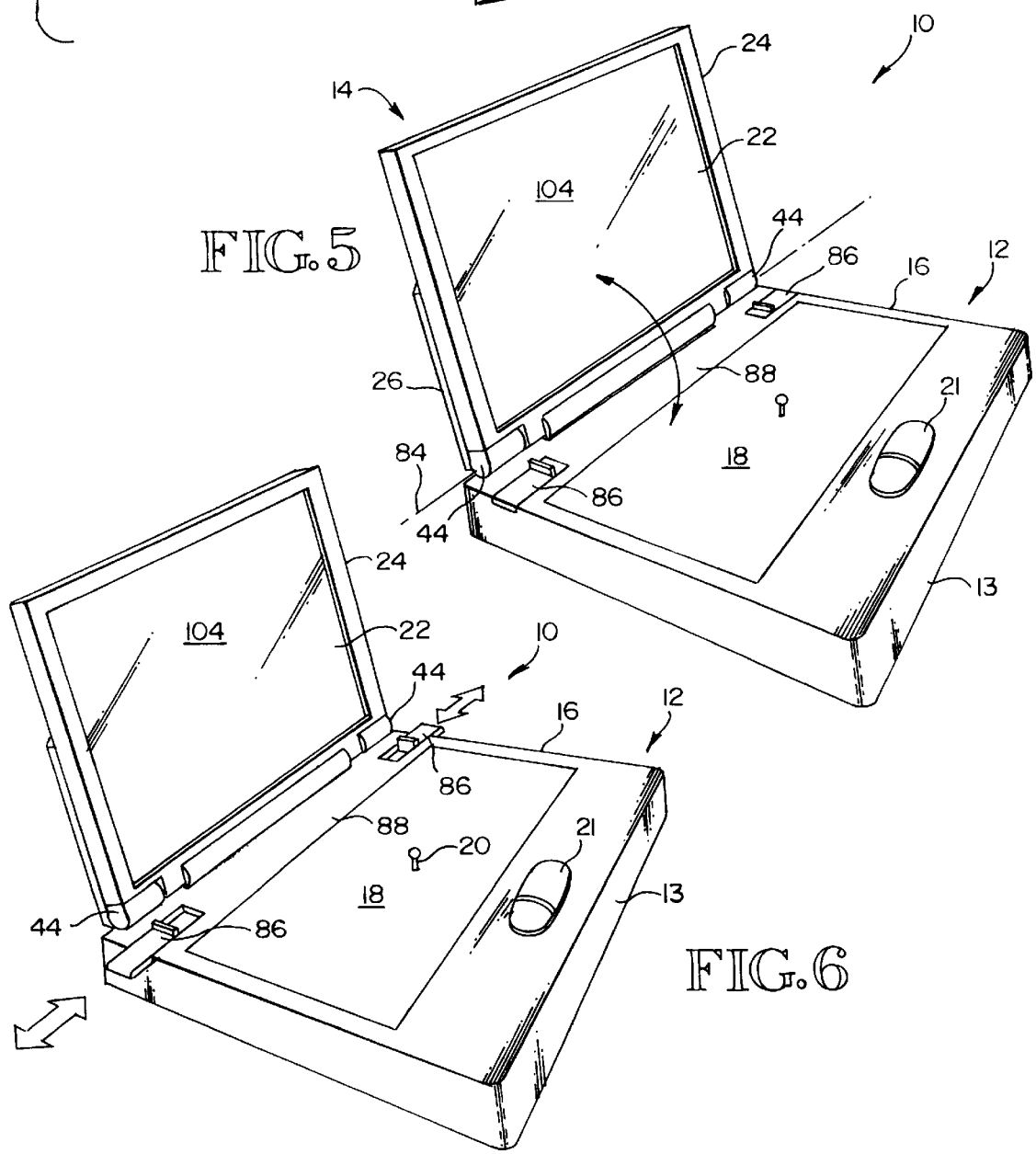
FIG. 5
FIG. 6

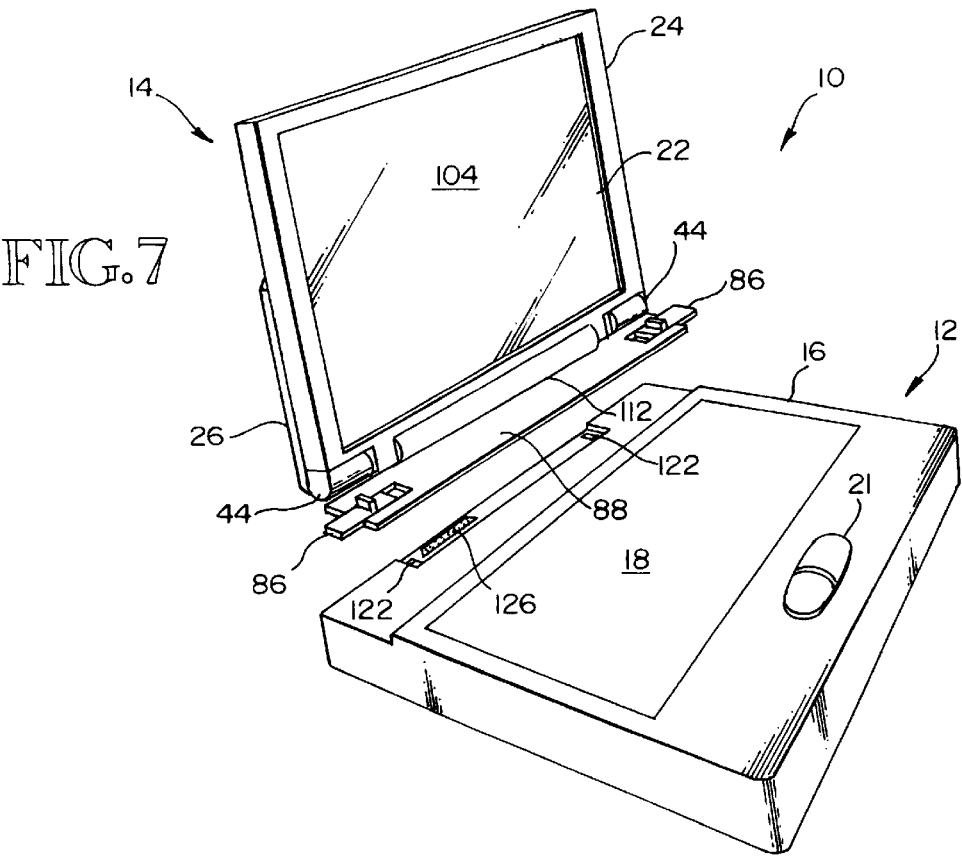
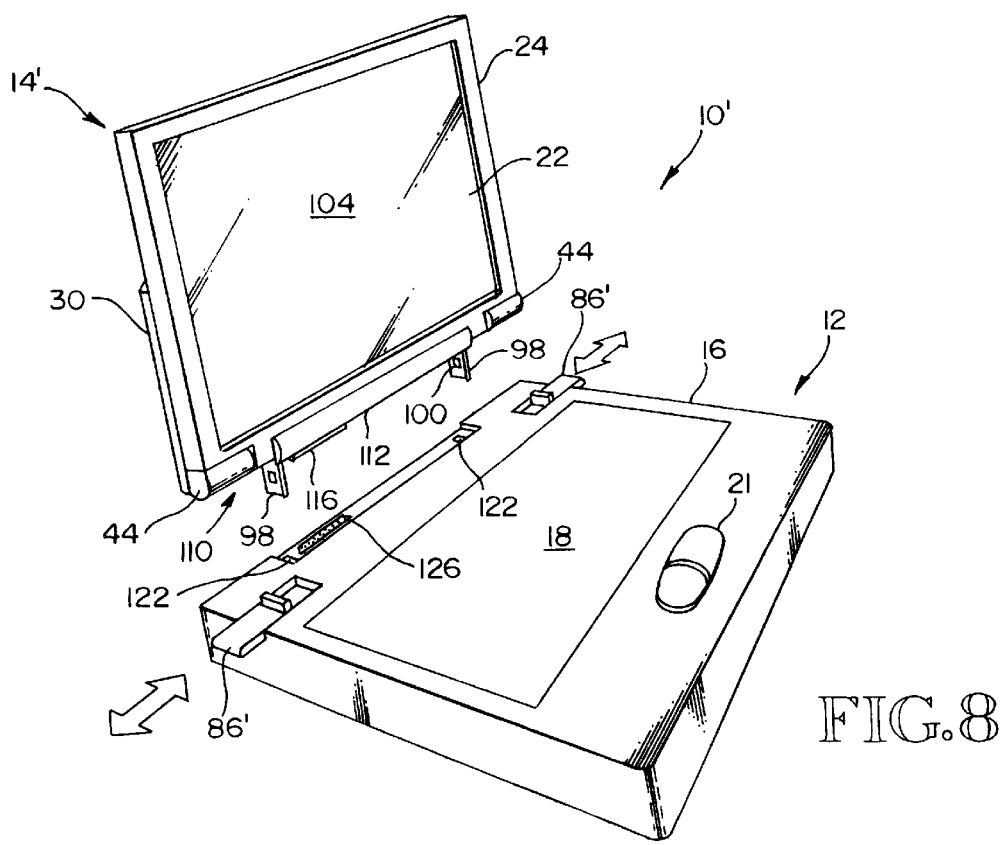

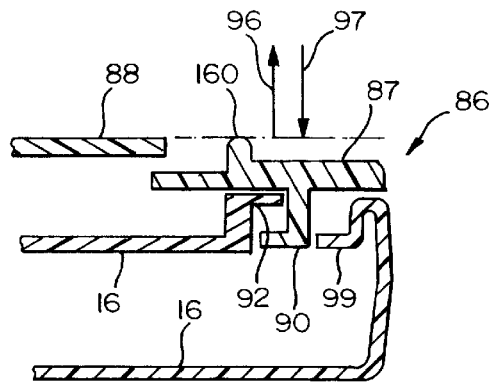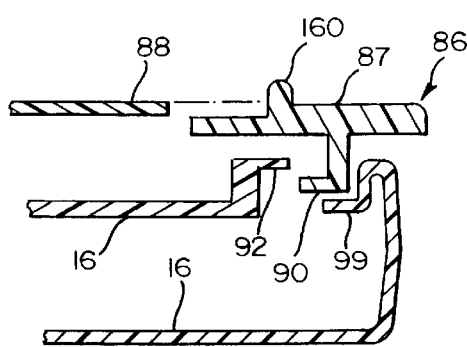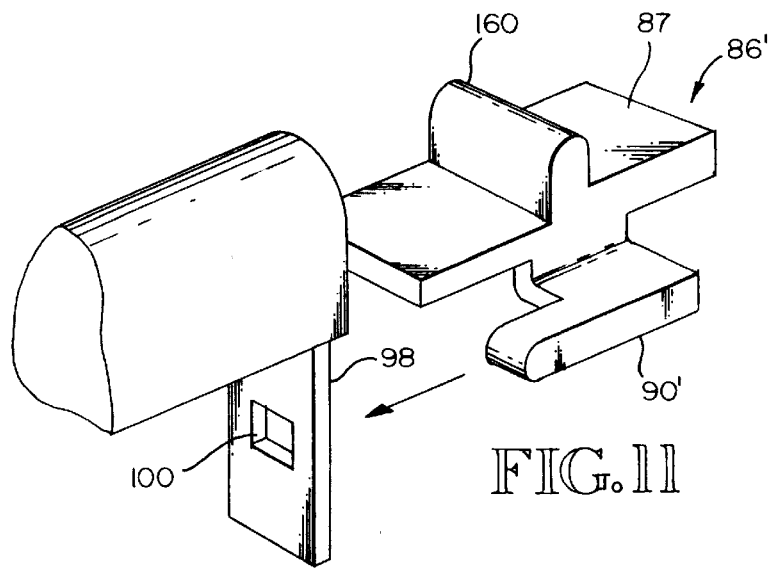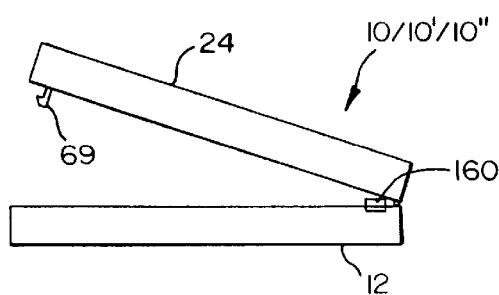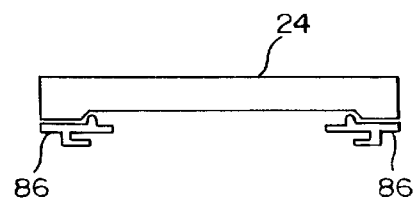

DETACHABLE FLAT PANEL COMPUTER DISPLAY AND SUPPORT

BACKGROUND OF THE INVENTION

This invention relates generally to portable computers with flat panel displays, and more particularly, to a detachable flat panel display and support.

The personal computer and computer work station are popular computer system architectures available in many different configurations having any of several different processors (e.g., 80386, 80486, 586, PENTIUM™, PowerPC™, Alpha) and operating systems (e.g., DOS, Windows 95, Windows NT, UNIX, MAC-OS, OS/2). Different categories by case size, include desktop computer, laptop computer, notebook computer and palm-top or hand-held computer. The laptop, notebook, and palm-top or hand-held computers also are referred to as portable computers. The desktop computer typically includes a system unit, a display and a keyboard. The system unit includes the essential circuitry such as a motherboard with central processing unit, a power supply, and data storage devices (e.g., hard disk drive, floppy disk drive optical disk drive). For the desktop computer configuration the system unit, display and keyboard typically are physically distinct units.

A portable computer is a popular configuration enabling increased mobility for a user. Typically, the motherboard, display and keyboard are integrated into a common case in a portable configuration. The notebook computer typically has a display housing and a keyboard housing permanently attached via a hinged relationship. A flat panel display is mounted within the display housing. A keyboard, motherboard, data storage unit(s), expansion slot, and I/O port are mounted in the keyboard housing. A conventional notebook computer is approximately the size of a standard sheet of paper (e.g., 21.6 cm by 27.9 cm; or in English units—8.5 inches by 11.0 inches). The thickness of such a notebook computer typically is 4.5 cm to 6.0 cm.

One of the benefits of the notebook computer case is that the computer is readily transportable. To use the computer one simply unlatches the display housing from the keyboard housing, rotates the display housing into an open position, and turns on the computer. The integral nature of the display, keyboard and main circuitry allows for improved transportability.

One of the ergonomic shortcomings of a notebook computer case is that the user cannot define independent positions for the keyboard and the display. The same feature that improves transportability poses an ergonomic shortcoming. Specifically, with the display and keyboard fixed to the computer case, one can set the computer at a position comfortable for keyboard entry or comfortable for viewing, but typically not comfortable for both keyboard entry and viewing. For example, one can set the computer so that the distance between a user's wrists and upper body is comfortable for keyboard entry. A comfortable viewing position is to have the viewer's eyeline perpendicular to the display screen. Given the computer position, the user rotates the display to be perpendicular to the eyeline. To achieve such a viewing orientation, the display screen typically is angled relative to the computer base at 30° to 45°. Such angling, however, often results in glare which deteriorates the user's viewing ability. If the display is angled to avoid glare and have the display screen be oriented so as not be perpendicular to the eyeline, different colors and contrasts may be perceived between the top and bottom portions of the screen (e.g., for large LCD displays). Thus, viewing comfort is compromised. Alternatively, one can position the computer at a comfortable distance and height for the eye. However, one's wrists then are at an uncomfortable position and the computer at an uncomfortable distance.

One solution to the shortcoming has been to provide additional ports to plug in a separate full size external keyboard or a separate CRT display. These solutions, however, are performed to enable one to use the notebook computer as one's full-time computer in the office. One does not lug around such a separate keyboard or display.

SUMMARY OF THE INVENTION

According to the invention, a notebook computer has a detachable display and stand. According to one aspect of the invention, the detachable display includes an integral support/stand for supporting the display apart from a main system unit of the notebook computer. According to an alternative aspect of the invention, a separate height adjustable stand is used to support the detached display.

The notebook computer includes a system unit and a display unit. The system unit houses the keyboard, central processing unit and mass storage device(s). The display unit is a detachable flat panel display unit foldable relative to the system unit between an open position for viewing the display panel and a closed position at which the display panel is held to the system unit. The display unit includes a display housing, a flat panel display and a support. The flat panel display is mounted to the display housing and defines a viewing plane. The support is hinged to the display housing and defines a support plane. The display unit rests upon the support when detached from the system unit. The display housing rotates relative to the support to define an adjustable angle between the viewing plane and the support plane.

According to an aspect of the invention, a structure for locking the display unit to the system unit is present. The display unit cannot be detached from the system unit while locked. The display unit, however, is operational and rotatable between the open position and closed position while locked. There is an indication of whether the display unit is locked or unlocked while attached to the system unit. In one configuration latches protrude beyond the sidewalls of the computer case clearly indicating that the display is not locked to the computer case. The display unit cannot achieve the closed position while the display unit is unlocked.

According to another aspect of the invention, a separate display stand is used with the detachable display. The display stand includes a base, a receiving portion at which the display unit attaches to the display stand, and an arm between the base and receiving portion. The base defines a support plane. The arm rotates relative to the support plane to define an adjustable height for viewing the display unit. A cable is included to maintain signal communication between the display unit and the system unit. The orientation of the display unit viewing plane is adjustable relative to the display stand.

One advantage of the invention is that a user can independently define positions for a notebook computer keyboard and display so as to improve ergonomic comfort, without compromising computer transportability. Another advantage is that a more convenient location of the display is achieved for giving presentations, while still be able to operate the computer. An advantage regarding the separate stand embodiment is that the user can adjust the viewing height of the detached display. These and other aspects and advantages of the invention will be better understood by reference to the following detailed description taken in conjunction with the accompanying drawings.

BRIEF DESCRIPTION OF THE DRAWINGS

FIG. 4 is an exploded view of a support hinge for the support of FIGS. 1 or 2;

FIG. 5 is a perspective view of a notebook computer in the open position with the display unit attached and locked to the system unit;

FIG. 6 is a perspective view of a notebook computer in the open position with the display unit attached and unlocked from the system unit;

FIG. 7 is a perspective view of a notebook computer with the display unit detached from the system unit;

FIG. 8 is a perspective view of another embodiment of the notebook computer with the display unit detached from the system unit;

FIG. 9 is a planar diagram of the locking mechanism of FIG. 7 in the locked position while the display unit is attached to the system unit;

FIG. 10 is a planar diagram of the locking mechanism of FIG. 7 in the unlocked position while the display unit is attached to the system unit;

FIG. 11 is a partial exploded view of the locking mechanism of FIG. 8 and a post of a display hinge of FIG. 8;

FIG. 12 is a planar side view of a notebook computer of FIGS. 1, 2 or 3 in which the display unit is blocked from achieving the closed position;

FIG. 13 is a diagram showing the relation between the display units of FIGS. 1, 2 or 3 and the locking mechanisms of FIG. 7 for which the display unit is able to achieve a closed position;

DESCRIPTION OF SPECIFIC EMBODIMENTS

Figure 1:
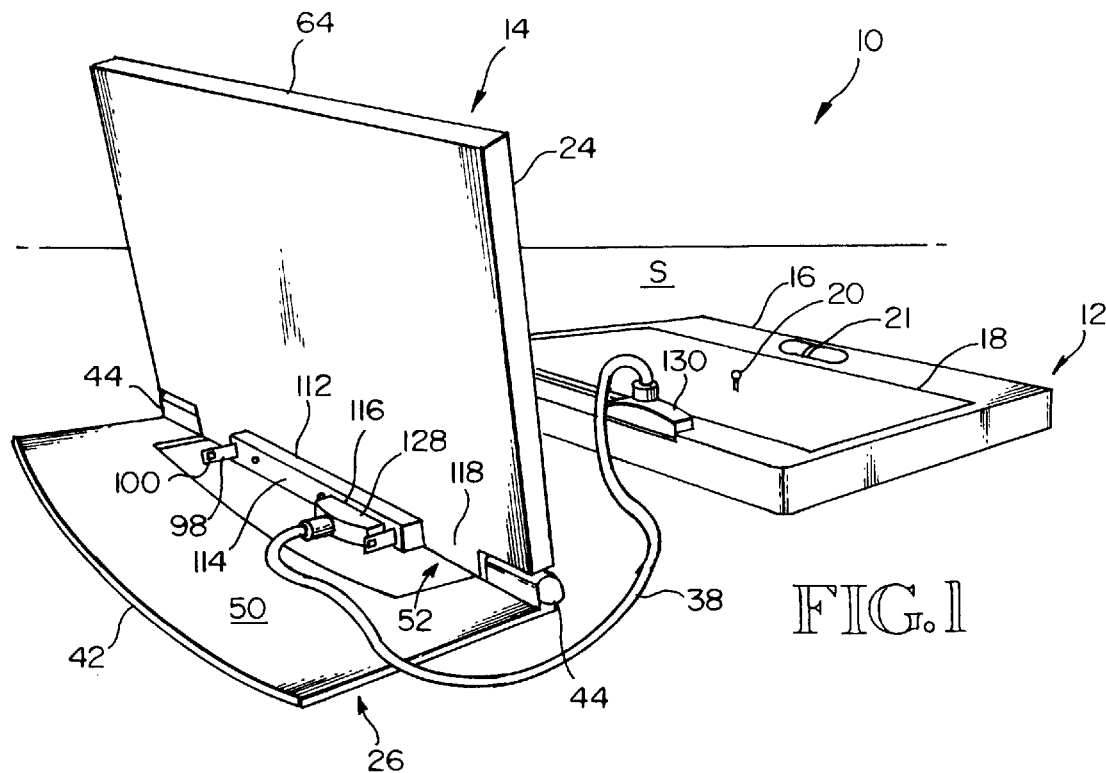
FIG. 1 is a perspective view of a notebook computer according to an embodiment of this invention.
Figure 2:
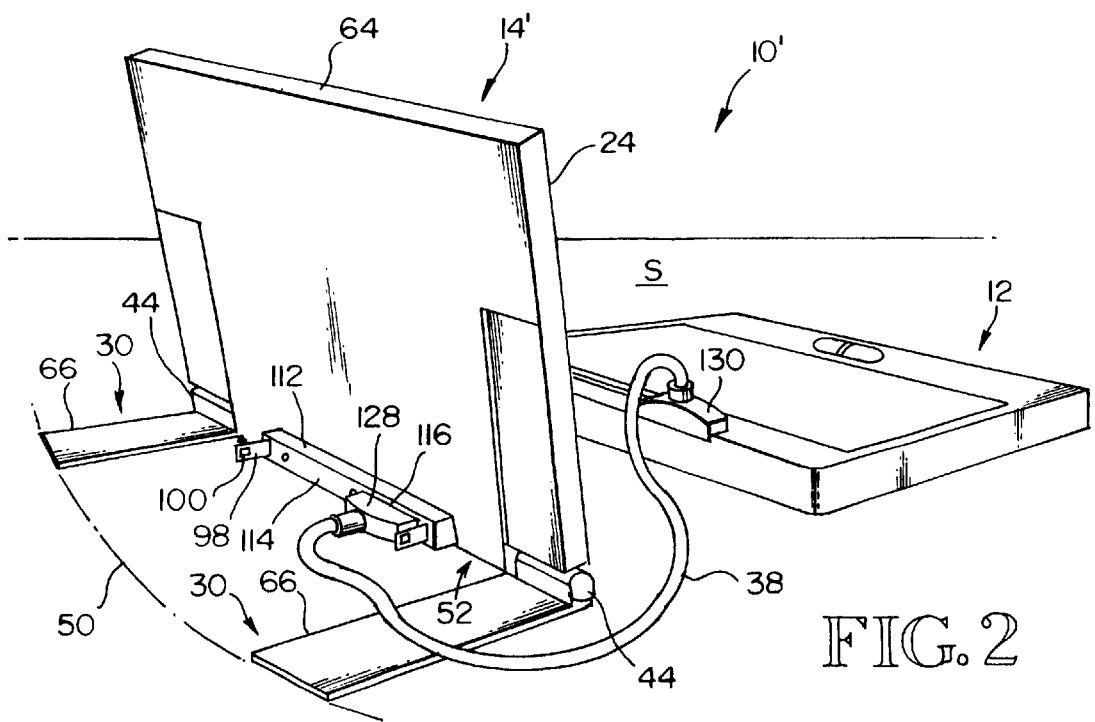
FIG. 2 is a perspective view of a notebook computer according to another embodiment of this invention.
Figure 3:
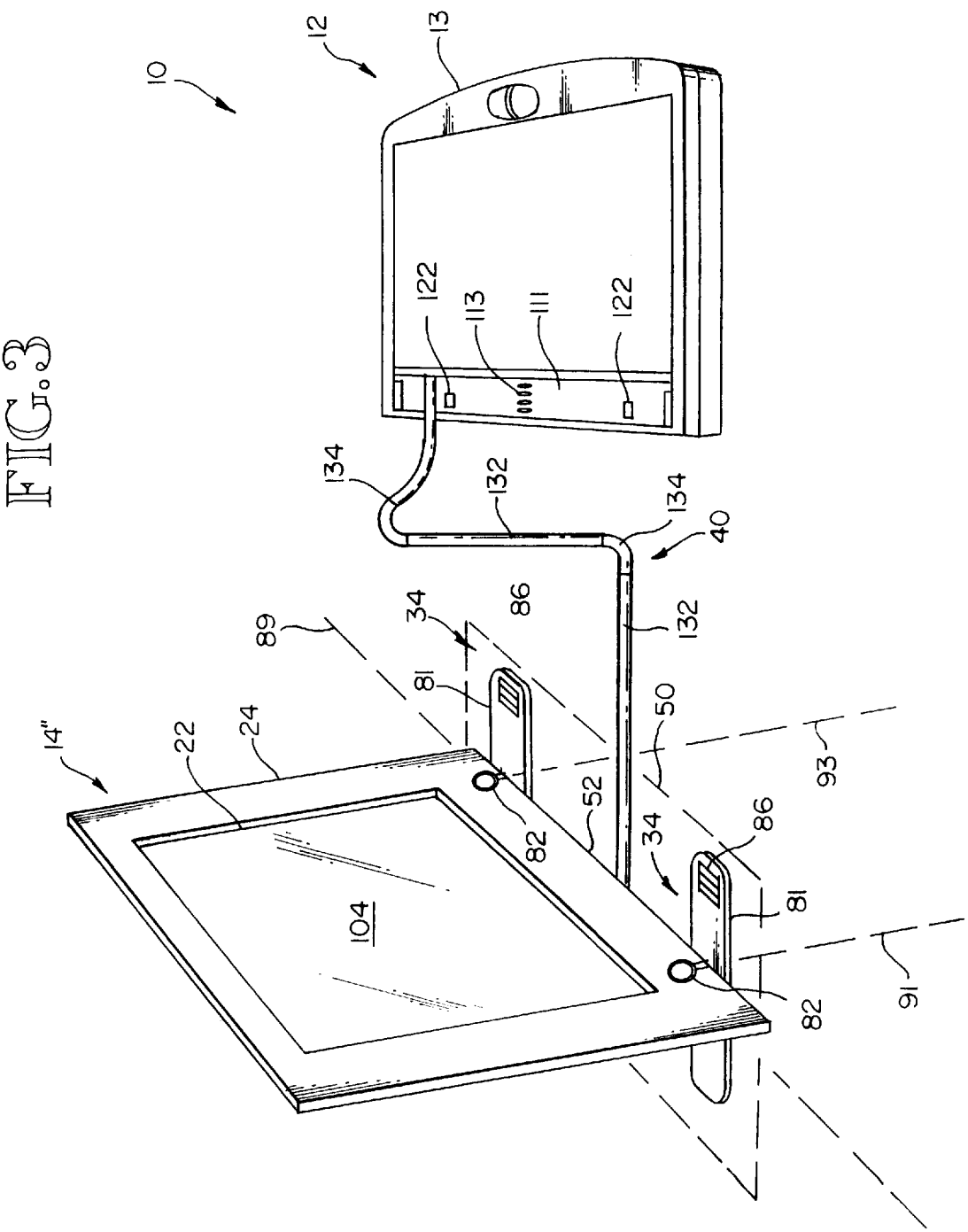
FIG. 3 is a perspective view of a notebook computer according to another embodiment of this invention.

FIGS. 1–3 show a notebook computer 10, 10', 10" according to three alternative embodiments of this invention. In each embodiment the notebook computer 10, 10', 10" includes a system unit 12 and a detachable display unit 14, 14', 14". The system unit 12 includes a housing 16, a keyboard 18, a motherboard with central processing unit (not shown), a pointing device 20, a clicking device 21, and a mass storage device (not shown). In some embodiments the system unit 12 also includes any one or more of the following: one or more expansion slots, various I/O ports, and a fax/modem or other peripheral device embodied in a plug-in PC card.

Each display unit 14, 14', 14" includes a flat panel display 22, a display housing 24 and an integral support. During use the system unit 12 and display unit 14 reside on a common or separate surface S. Referring to FIG. 1, a planar support 26 extends the length of the display housing 24 and is rotatably coupled to the display housing 24. Referring to FIG. 2, two spaced supports 30 are rotatably coupled to the display housing 24. The planar support 26 and the two spaced supports 30 each fold down and/or out from the display housing 24. Referring to FIG. 3, two supports 34 are coupled to a bottom edge of the display housing and rotate relative to a plane of the display unit with multiple degrees of freedom. A cable 38, fiberoptic 40 or other communication link (e.g., infrared) provides a signal path between the system unit 12 and the detached display unit 14, 14', 14".

Integral Support Embodiments

Referring to the FIG. 1 embodiment, the support 26 includes an extension 42 and a pair of hinges 44. In the embodiment shown, the hinges 44 are located at the lower edge 52 of the display housing 24. The extension 42 rotates out and down from the display housing 24 toward the surface S. The extension 42 serves as a base defining a support plane 50 of sufficient length and width to stabilize the display unit 14 when detached and set up for use. In one embodiment the extension 42 is formed of molded plastic, and extends the length of the display housing 24 and a width of at least one half the height of the display housing 24. In an alternative embodiment the hinges 44 are located away from the bottom edge 52, preferably within the area between the top edge 64 and mid-height, inclusive of the display housing 24. In such alternative embodiment the extension 42 rotates out from the bottom edge 52 defining a leg. The support plane 50 then is along the length of the leg. In either embodiment the angle between the support plane 50 and a viewing plane defined by the display panel 22 is adjustable.

Referring to the FIG. 2 embodiment, the supports 30 include a pair of extensions 66 and the respective hinges 44. In the embodiment shown, the hinges 44 are located at the lower edge 52 of the display housing extension. The extensions 66 rotate out and down from the display housing 24 toward the surface S. The extensions 66 define a support plane 50. The legs 66 are located sufficiently apart and of sufficient length to stabilize the display unit 14 when detached and set up for use. In one embodiment the extensions 66 are formed of molded plastic, are spread the length of the display housing 24, and have a length at least one half the height of the display housing 24. In an alternative embodiment the hinges 44 are located away from the bottom edge 52, preferably within the area between the top edge 64 and mid-height, inclusive of the display housing 24. In such alternative embodiment the extensions 66 rotate out from the bottom edge 52 defining a pair of legs. The support plane 50 then is along the length of the legs. In either embodiment the angle between the support plane 50 and a viewing plane defined by the display panel 22 is adjustable.

Each support hinge 44 allows for movement of an extension (42/66) in one degree of freedom relative to the display housing 24. There is sufficient resistance to motion in the support hinge 44, however, to maintain a fixed angular relationship between the support plane 50 and the viewing plane under the weight of the display housing 24 and panel 22. FIG. 4 shows an exploded view of the support hinge 44. Each hinge 44 includes a plastic tube 70 fitted between a cap 72 and a hinge housing 74. A pin 76 protrudes from the display housing 24 and mates to the tube 70 to define an axis of rotation 78 for the support 26/30. A spring 77 abuts the plastic tube 70 at spring end 79. The end 79 is in fixed relationship to the tube 70, moving with the tube 70 (see FIGS. 4 and 12). More specifically, the spring provides resistance countering the weight of the display housing 24 and panel 22. The pin 76 also serves as a connecting link joining the support 26/30 to the display housing 24. A screw 80 holds the cap 72 and tube 70 to the hinge housing 74.

Referring to the FIG. 3 embodiment, two supports 34 are coupled to the bottom edge 52 of the display housing 24. Each support 34 includes a planar extension 81 and a coupling mechanism 82. The coupling mechanism 82 allow movement of an extension 81 in multiple degrees of freedom relative to the display housing 24. In one embodiment the coupling mechanism includes a ball joint. In a preferred embodiment the two extensions 81 have a length accumulating to the approximate length of the display housing 24. The ball joints 82 have sufficient frictional resistance to maintain the display housing 24 and panel 22 in a fixed position relative to the extensions 81 under the weight of the housing 24 and panel 22. Each extension 81 is movable about a first axis 89 which is parallel to the bottom edge 52 of the display housing 24. One extension 81 also is movable about a second axis 91 orthogonal to the first axis 89. The other extension 81 is movable about a third axis 93 parallel to the second axis 91 and orthogonal to the first axis 89. For the ball joint embodiment the axes of rotation 89, 91, 93 are variable.

Detachment of the Display Unit

FIGS. 5–8 depict the detachment of the display unit 14, 14',14" from the system unit 12 according to an embodiment of this invention. The display unit 14, 14', 14" while attached to the system unit 12, rotates about an axis 84 between an open position (shown) and a closed position. In the closed position the display panel 22 is flat against the system unit 12 at keyboard 18. Conventionally, a latch or other mechanism 69 (see FIG. 12) secures the display unit 14 in the closed position (not shown) to prevent the display unit 14 from opening during travel.

The notebook computers 10, 10', 10" includes locking mechanisms 86/86' for preventing detachment of the display unit 14, 14', 14" from the system unit 12. The locking mechanisms 86, 86' have a locked position and an unlocked position. The notebook computer 10, 10', 10" is stored in the closed position with the locking mechanisms 86/86' in the locked position. To detach the display unit 14, 14', 14" the notebook computer first is opened rotating the display unit out of the closed position away from the system unit 12 as shown in FIG. 5. Next the locking mechanisms 86/86' are slid from the locked position into the unlocked position as shown in FIG. 6. The display unit 14, 14', 14" then is detached from the system unit 12 as shown in FIGS. 7 or 8. In doing so the connection between edge connectors 116 and 126 of the display unit and system unit, respectively is separated, and the connection between posts 98 of the display unit 14, 14', 14" and openings 122 in the system unit 12 are separated (best seen in FIG. 8).

Locking Mechanisms

FIGS. 9 and 10 show one embodiment of the locking mechanism 86. Each locking mechanism 86 includes a planar portion 87, a hook portion 90 protruding from the planar portion 87, and a ridge 160. The planar portion 87 fits to an area of a frame 88. The locking mechanism slides within the frame 88 by pushing or pulling on the ridge 160 or planar portion 87. In doing so, the hooked portion 90 is moved into or out of engagement. FIG. 9 shows the locking mechanism 86 in the locked position with the hooked portion 90 engaging a ridge 92 of the keyboard housing 16. In such embodiment the locking mechanism 86 and frame 88 are part of the display unit (as shown in FIGS. 3 and 7). When pulling the display unit away from the system unit 12 the keyboard housing 16 abuts the hooked portion 90 preventing detachment. By moving the locking mechanism 86 into the unlocked position the hooked portion 90 moves out of engagement with the keyboard housing ridge 92 as shown in FIG. 10. When pulling the display unit away from the system unit 12 the hooked portion 90 clears the ridge 92 allowing detachment.

FIG. 11 shows an alternative embodiment of the locking mechanism 86'. In such embodiment the locking mechanism 86' and frame 88 are part of the system unit 12 (as shown in FIG. 8). The locking mechanism 86' includes the planar portion 87 and ridge 160 of the FIG. 8 mechanism 86. In addition a hooked portion 90' also is included. The hooked portion 90', however hooks an opening 100 in the post 98 of the display unit. Thus, the hooked portion 90' extends away from the planar portion 87 so as to align with the opening 100. When in the locked position the hooked portion 90' engages the post 98 at opening 100. When pulling the display unit away from the system unit 12 the post 98 is held within opening 122 by the hooked portion 90' preventing detachment. By moving the locking mechanism 86' into the unlocked position the hooked portion 90' moves out of engagement with the post 98 as shown in FIG. 11. When pulling the display unit away from the system unit 12 the post 98 clears the hooked portion 90' allowing detachment.

In some embodiments the locking mechanisms provide a visual indication of whether the display unit is locked or unlocked while attached to the system unit. In one embodiment the planar portion 87 extends beyond the sides of the system unit 12 when in the unlocked position (see FIGS. 6–8). When in the locked position the planar portions 87 do not extend beyond such edges. Thus, the protruding planar portions 87 provide a visual indication of the locked and unlocked positions. In another embodiment, the position of the ridge 160 lines up to one marker for the locked position and another marker for the unlocked position. In yet another embodiment, the planar portion 87 has a portion of differing color from the rest of the locking mechanism. When in the locked position such differing color is hidden beneath frame 88. When unlocked such differing color is exposed within the frame 88 perceivable to a user.

In preferred embodiments the locking mechanism and ridge 160 protrude to one height when in the locked position and another height when in the unlocked position. Referring to FIGS. 9 and 10 the hooked portion 90 of the locking mechanism 86 slides along a shelf 99 of the keyboard housing 16. When slid into the locked position the hooked portion 90 slides off the shelf 99 allowing the locking mechanism 86 to assume a first height relative to the system unit 12. While in the unlocked position the hooked portion 90 is on the shelf causing the locking mechanism 86 to assume a second height relative to the system unit. The second height is higher than the first height. While at the second height the ridge 160 of the locking mechanism 86 prevents the display unit from folding completely flush to the system unit. In effect this prevents the display unit from achieving a closed position because the latch 95 at the display housing 24 cannot mate to a receptacle toward the front edge 13 of the system unit 12, as shown in FIG. 12. FIG. 13 shows locking mechanisms 86 in the locked position relative to the display unit 24. In the locked positions, the ridge 160 is inward from the display screen border where there is sufficient clearance for the display unit to achieve the closed position without being blocked by the locking mechanisms 86.

With regard to the display unit 14" embodiment of FIG. 3, the locking mechanisms 86 are part of the extensions 81 of the respective supports 34. In such embodiment the frame 88 is formed in two parts and is embodied by the extensions 81. While attached to the system unit 12, the extensions 81 of the supports 34 extend in a common line and reside in a common plane. Once the display unit 14" is detached it is put into use by rotating the extensions 81 out of the common line to define separate supports 34 as shown in FIG. 3. The supports are applied to a surface S bringing them into a common support plane 50. The display panel 22 which defines a viewing plane 104 then is oriented at a desired angle relative to the support plane 50. Such angle is adjustable. During such movement of the extensions 81 relative to the display housing 24, the extensions 81 have rotational components about the first axis 89 (see FIG. 3). In addition one extension also has a rotational component about a second axis 91, while the other extension has a rotational component about the third axis 93. The locking mechanisms 86' prevent the display unit from closing when in the unlocked position in the same manner as the locking mechanisms 86 (as per FIGS. 12 and 13).

Display Hinge and Communication Interface

Figure 14:
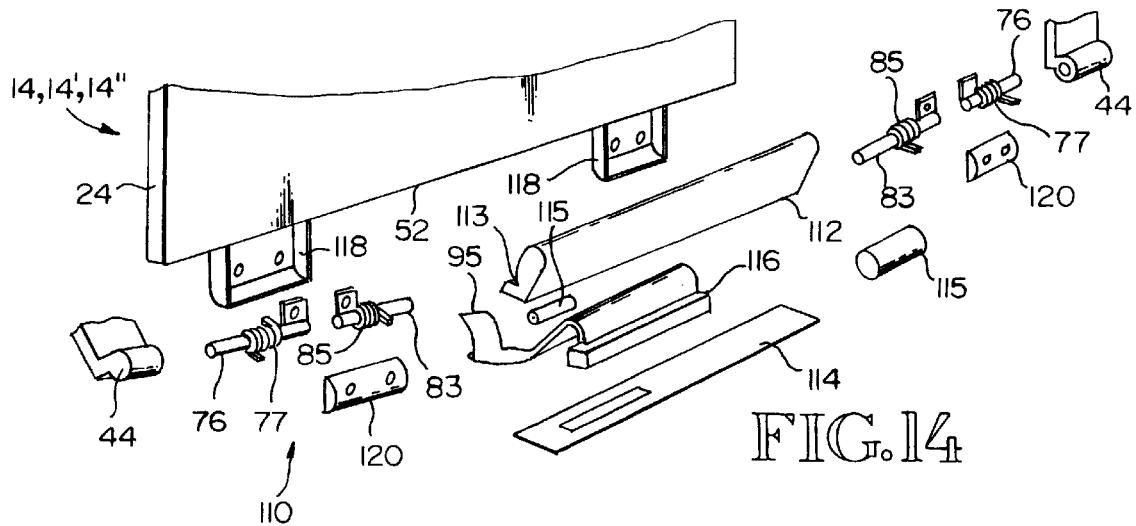
FIG. 14 is an exploded view of the display hinge of FIGS. 1–3 with a partial view of the display unit and support hinges of FIGS. 1–2.

Each display unit 14, 14', 14" also includes a display hinge 110 for rotating the display unit relative to the system unit while attached to the system unit 12. FIG. 14 shows an exploded view of the display housing hinge 110. The display hinge 110 includes a first elongated member 112 and face plate 114. A pair of tubes 115 and an electrical edge connector 116 are positioned within the elongated member 112. The edge connector 116 protrudes through the face plate 114. The elongated member 112, face plate 114 and edge connector 116 remain in fixed orientation relative to the system unit 12 while attached. An indentation 113 occurs along the length of the elongated member 112. Referring to FIGS. 1, 2 and 14 the display unit 24 rotates relative to the hinge 110 into the indentation 113. The indentation 113 serves to extend the display unit angular position range. The display unit 24 is able to be rotated further backward into the indentation 113.

The display hinge 110 also include housings 118 integral to the display housing 24. The housings 118 are spaced apart along the bottom edge 52 of the display housing 24 by a length equal to the length of the elongated member 112. Within each housing 118 are two pins 76, 83 and two springs 77, 85. A cap 120 covers the pins and springs within the housing 118. The pins 76 extend to engage the tubes 70 of the support hinges 44. The pins 83 extend to engage the tubes 115. In the FIG. 7 embodiment the frame 88 supporting the locking mechanisms 86 are fixed relative to the elongated member 112 and move with the elongated member 112.

One or more plug connections hold the display unit to the system unit 12 while attached. In one embodiment of the plug connection, two posts 98 protrude from the face plate 114 of the display hinge 110. These posts 98 mate to openings 122 in the system unit 12.

A pin 83 is hollow to received a flexible circuit 95 or cable electrically linking the edge connector 116 to the display panel 22. The flexible circuit 95 extends through the pin 83 into the housing 118 up into the display housing 24. The edge connector 116 mates to an edge connector 126 at the system unit 12 when the display unit is attached to the system unit 12 to provide electrical communication between the display unit 14, 14', 14" and the system unit 12. While detached, a signal communication link between the display unit 14, 14', 14" and system unit 12 is established via a cable 38. The cable 38 couples to the edge connector 116 with an edge connector 128 and to edge connector 128 with an edge connector 130. In some embodiments a cable extends from the system unit 12 to the display unit 14, 14', 14" while the display unit is detached.

In alternative embodiments, a fiberoptic connection 40 is established. Such connection 40 includes one or more fiberoptics 132 and flexible cable portions 134. The fiberoptics 132 extend from the system unit 12 to the display unit 14, 14', 14" (see FIG. 3). In such embodiments a permanent or detachable connection is established at the display hinge 110 in place of the edge connector 116. The fiber optics 132 are held by clips 113 within a groove 111 of the system unit while the display is attached to the system unit. In some embodiments the fiber optic connection defines the signal path between the display unit 14, 14', 14" and the system unit 12 regardless of whether the display unit is attached or detached. In another embodiment a cable extends from the system unit 12 an infrared communication link is established between the display unit and system unit 12.

Re-Attachment of the Display Unit

To re-attach the display unit 14" to the system unit 12 the cable 38 is removed. The supports 34 then are rotated back into a common line parallel to the lower edge 52 of the display housing 24. The supports 34 also are oriented into a common plane. Further, the supports are positioned with the locking mechanisms 86 pointing out toward the side edges of the display housing 24. The posts 98 of the display unit 14" then are plugged back into the openings 122 of the system unit. For the cable 38 embodiment, the edge connector 116 is mated to the edge connector 126.

For the fiberoptic signal path embodiment, the fiber optics 132 are folded as the display unit is moved toward the system unit. The supports 34 are oriented in the common line and common plane as described above. The supports 34 and fiberoptics 132 then are inserted into the recess 111. The fiberoptics 132 are snapped into clips 113 which hold the fiberoptics 132 in place. Alternatively, the fiberoptic signal path is removable and the display reconnected without fiberoptics.

For either embodiment, the locking mechanisms 86 then are moved into the locked position. The display unit 14" is now attached. The computer 10" can then be stowed or operated with the attached display.

To re-attach the display nits 14, 14' the cable 38 is removed and the extension 42/66 are folded to the display unit. The display unit 14, 14' then is plugged into the system unit 12. To do so, the edge connector 116 is mated to the edge connector 126. In addition the posts 98 are mated to the openings 112. For a fiberoptic connection, the fiberoptics 132 are stowed as described above for display unit 14". The display unit 14, 14' is now attached and operational. It is preferred that the display unit next be locked to the system unit. This is achieved by moving the locking mechanisms 86/86' to the locked position. Once locked, the display unit is closed to the system unit. As described above, the computer cannot be closed with the display unit latched to the system unit via latch 69 unless the locking mechanisms 86/86' are moved to the locked position.

Non-Integral Height Adjustable Display Stand

Figure 15:
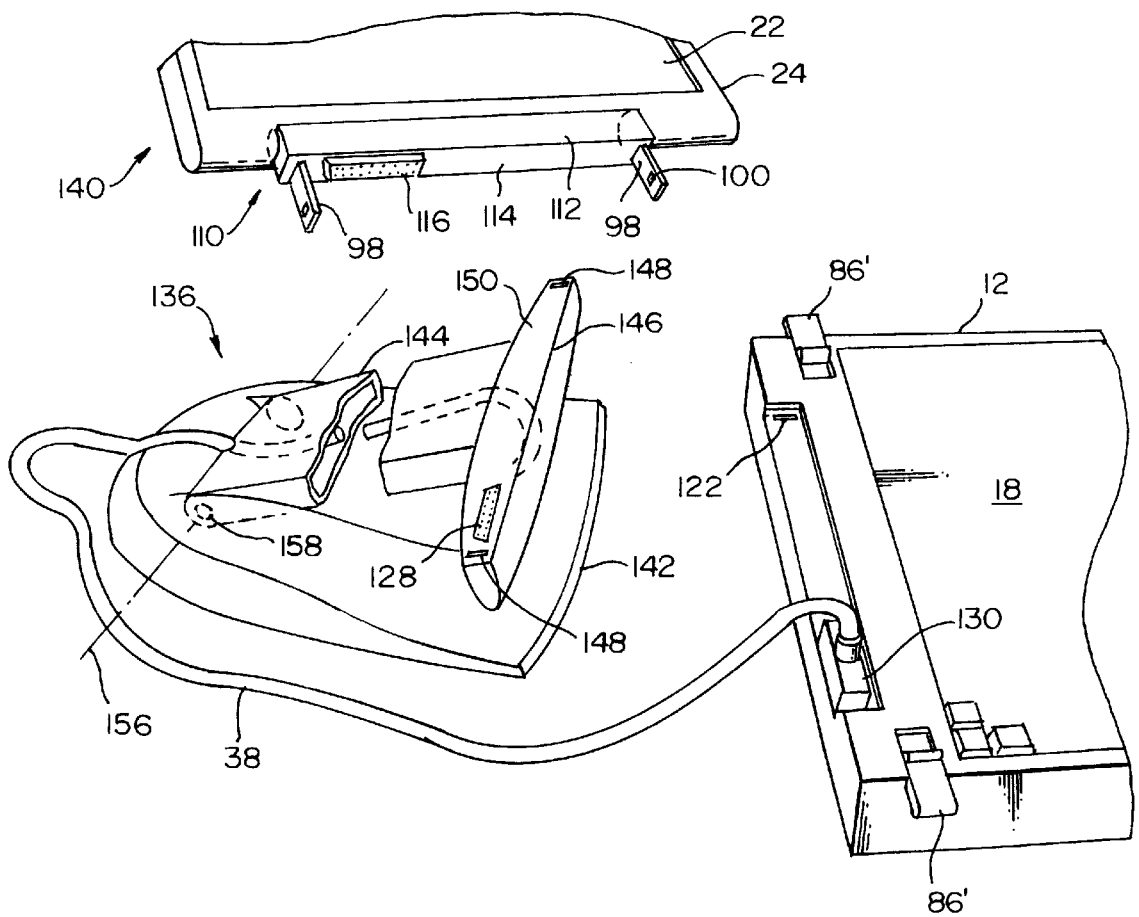
FIG. 15 is a perspective view of a notebook computer and display stand according to an embodiment of this invention.
Figure 16:
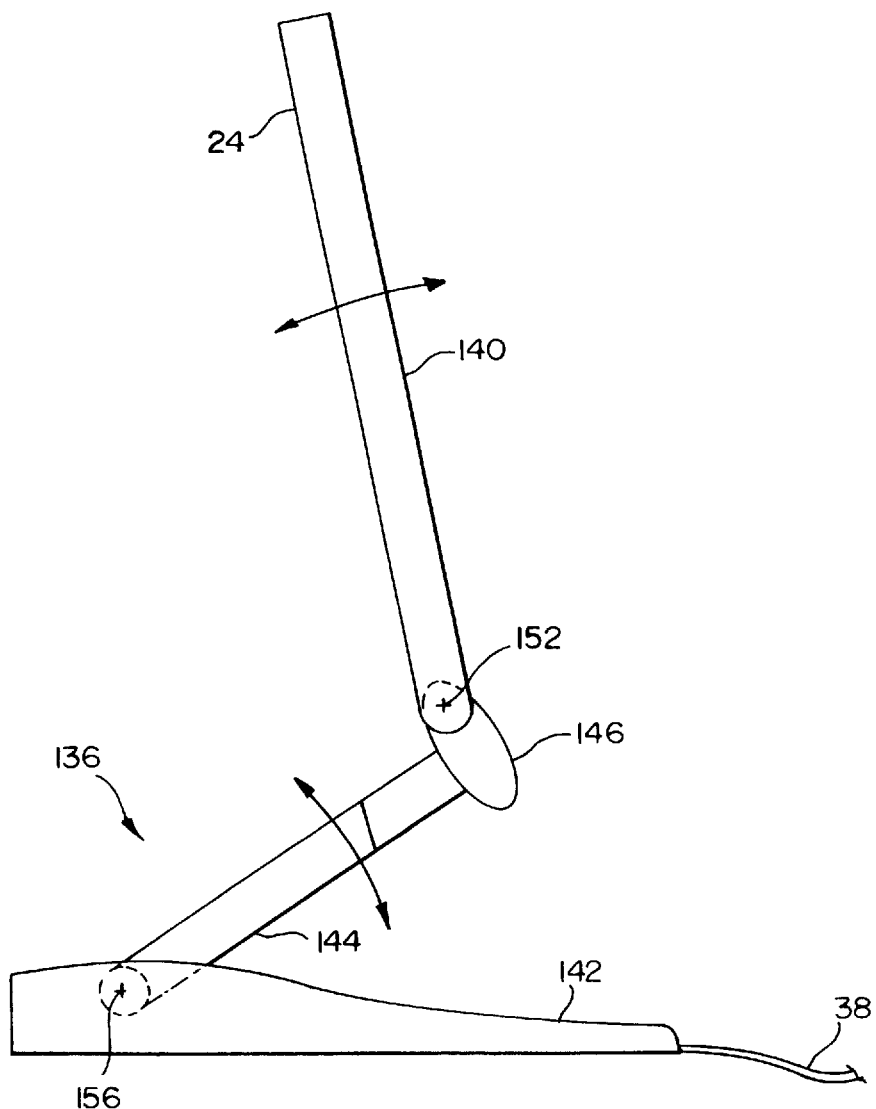
FIG. 16 is a planar side view of the display stand of FIG. 15.

FIGS. 15 and 16 show a separate stand 136 which is not integral to a notebook computer. The notebook computer includes a system unit 12 as previously described, along with a detachable display unit 140. The display unit 140 is embodied by a display unit 14, 14', 14" embodiment as previously described. In some embodiments the display unit 140 does not include the integral support 26/30/34. The separate stand 136 includes a base 142, an arm 144 and a connection interface 146. The stand also includes a cable 38 having edge connectors 128, 130 at opposing ends. The display unit 140 plugs into the connection interface 146 via posts 98. The posts 98 are received into respective openings 148 at the connection interface 146. The edge connector 116 of the display unit 140 mates to the edge connector 128 of the stand 136. In a preferred embodiment the connection interface 146 defines an elongated surface 150. When the display unit is mounted to the stand 136 the face plate 114 of the display hinge is positioned flush to the surface 150. The display unit 140 is rotatable relative to the connection interface 46 via the display hinge 110. The display hinge 110 defines a pivot axis 152 (see FIG. 16) allowing a user to define the orientation of the viewing plane of the display unit 140.

The arm 144 is rotatable about an axis 156 relative to the stand base 142. The arm is movable between a first position in which the connection interface 46 is closest to the base 142 to a second position at which the connection interface 146 is removed from the base 142. Rotation of the arm 144 adjusts the height of the display unit 140. The axis 156 is defined by a hinge 158. In one embodiment the hinge 158 includes like components as the display hinge components 83, 85, and 115. The hinge 158 springs (e.g., 85) provide sufficient resistance to maintain the arm at a fixed position under the weight of the display unit 140. In various embodiments the base is of varying shape and size. The base 142, however, is of sufficient size to prevent the stand 136 from tipping under the weight of the display stand 140.

Meritorious and Advantageous Effects

One advantage of the invention is that a user can independently define positions for a notebook computer keyboard and display so as to improve ergonomic comfort, without compromising computer transportability. An advantage regarding the separate stand embodiment, is that the user can adjust the viewing height of the detached display.

Although preferred embodiments of the invention have been illustrated and described, various alternatives, modifications and equivalents may be used. Therefore, the foregoing description should not be taken as limiting the scope of the inventions which are defined by the appended claims.

What is claimed is:

1. A portable computer, comprising:

a system unit having a keyboard and central processing unit;

a flat panel display unit removably attached to the system unit, the display unit folding relative to the system unit between an open position for viewing a display panel and a closed position at which the display panel is held to the system unit, wherein the display unit comprises a display housing, the display panel and a support, the display panel mounted to the display housing and defining a viewing plane, the support hinged to the display housing and defining a support plane; wherein the display panel is blocked from view when the display unit is in the closed position; and wherein the display unit rests upon the support when detached from the system unit, the display housing rotating relative to the support to define an angle between the viewing plane and the support plane; and means for locking the display unit to the system unit; wherein the display unit is undetachable from the system unit while locked; and wherein the display unit is rotatable relative to the system unit while locked; and means for blocking the display unit from achieving the closed position when the display unit is attached to the system unit, is unlocked relative to the system unit, and is rotatable relative to the system unit toward the closed position.

2. The portable computer of claim 1, further comprising means for indicating whether the display unit is locked or unlocked when attached to the system unit.

3. The portable computer of claim 2, in which the indicating means comprises the blocking means.

4. A portable computer, comprising:

a system unit having a keyboard and central processing unit;

a flat panel display unit removably attached to the system unit, the display unit folding relative to the system unit between an open position for viewing a display panel and a closed position at which the display panel is held to the system unit, wherein the display unit comprises a display housing, the display panel and a support, the display panel mounted to the display housing and defining a viewing plane, the support hinged to the display housing and defining a support plane; and wherein the display unit rests upon the support when detached from the system unit, the display housing rotating relative to the support to define an angle between the viewing plane and the support plane; and means for locking the display unit to the system unit; wherein the display unit is undetachable from the system unit while locked; and wherein the display unit is rotatable relative to the system unit while locked; and means for preventing the display unit from achieving a closed position when the display unit is unlocked relative to the system unit; and wherein the support comprises a first support and a second support, the first support and second support being independently rotatable relative to the viewing plane, the first support and second support defining the support plane when supporting the display unit, the first support and second support rotatable about a common first axis to define the support plane, the first support rotatable about a second axis for rotating within the support plane, the second support rotatable about a third axis for rotating within the support plane.

5. The portable computer of claim 4, wherein the preventing means blocks the display unit from achieving a closed position when the display unit is attached to the system unit while the display unit is unlocked relative to the system unit.

6. A portable computer and display stand combination, the display stand for supporting the display unit when detached from the system unit, the display stand being adjustably positioned apart from the system unit, the portable computer comprising:

(a) a system unit having a keyboard and central processing unit; and (b) a flat panel display unit removably attached to the system unit, the display unit folding relative to the system unit between an open position for viewing the display panel and a closed position at which the display panel is held to the system unit, the display unit comprising: (i) a display housing, and (ii) a flat panel display; and the display stand comprising:

(a) a base upon which the display stand rests;

(b) means for receiving the display unit when detached from the system unit;

(c) an arm coupling the base and receiving means, the arm rotatable relative to the base to define an adjustable height for viewing the display unit; and (d) means for maintaining signal communication between the display unit and the system unit.

7. A display stand for supporting a detachable display of a portable computer, the portable computer having a system unit and the detachable display unit, the display unit foldable relative to the system unit between an open position for viewing the display panel and a closed position at which the display panel is held to the system unit, the stand comprising:

a base upon which the display stand rests, the base defining a support plane;

means for receiving the display unit when detached from the system unit;

an arm coupling located between the base and receiving means, the arm rotatable relative to the support plane to define an adjustable height for viewing the display unit; and means for maintaining signal communication between the display unit and the system unit.

* * * * *